US010701918B1

(12) United States Patent
Rutledge

(10) Patent No.: US 10,701,918 B1
(45) Date of Patent: Jul. 7, 2020

(54) INSULATED HOLDER FOR BEVERAGE CONTAINER WITH FISHING SPOOL

(71) Applicant: Jacob Rutledge, Sand Springs, OK (US)

(72) Inventor: Jacob Rutledge, Sand Springs, OK (US)

( * ) Notice: Subject to any disclaimer, the term of this patent is extended or adjusted under 35 U.S.C. 154(b) by 303 days.

(21) Appl. No.: 15/808,297

(22) Filed: Nov. 9, 2017

(51) Int. Cl.
*A01K 89/08* (2006.01)
*A01K 97/06* (2006.01)
*A47G 23/02* (2006.01)

(52) U.S. Cl.
CPC .............. *A01K 89/08* (2013.01); *A01K 97/06* (2013.01); *A47G 23/0216* (2013.01); *A47G 2023/0283* (2013.01)

(58) Field of Classification Search
CPC ........ A01K 97/06; A01K 97/00; A01K 99/00; A01K 91/02; A01K 89/00; A01K 89/003; A01K 89/08; A01K 89/081; A47G 23/0216; A47G 2023/0283
USPC .......................................................... 43/57.1
See application file for complete search history.

(56) References Cited

U.S. PATENT DOCUMENTS

| | | | |
|---|---|---|---|
| D171,880 S | 4/1954 | Bellinger | |
| 3,179,351 A | 4/1965 | Ehlert | |
| 3,641,695 A * | 2/1972 | Zenick | A01K 91/02 43/19 |
| 4,596,370 A * | 6/1986 | Adkins | B62J 11/00 224/414 |
| 4,727,671 A * | 3/1988 | Archer | A01K 89/08 43/4 |
| 4,749,162 A * | 6/1988 | Wanzor | A01K 97/10 114/364 |
| 5,092,075 A * | 3/1992 | Campos | A01K 97/06 43/54.1 |
| 5,102,085 A * | 4/1992 | Wieczorek | B60N 3/102 224/926 |
| 5,253,445 A * | 10/1993 | Spoonemore | A01K 93/00 43/17 |
| 5,655,742 A | 8/1997 | Whitman et al. | |
| 6,029,391 A | 2/2000 | Holley et al. | |
| 6,260,697 B1 * | 7/2001 | Fraser | A01K 97/10 206/217 |
| 6,796,076 B1 * | 9/2004 | Bennett | A01K 91/10 43/16 |
| 6,854,207 B1 | 2/2005 | Strope | |
| 6,991,505 B1 | 1/2006 | Wells | |
| 9,420,908 B1 | 8/2016 | White | |
| 10,159,236 B2 * | 12/2018 | Grimes | A01K 91/02 |
| 10,307,006 B2 * | 6/2019 | Knoll | A47G 23/0225 |
| 2005/0210729 A1 | 9/2005 | Maxwell | |
| 2006/0091141 A1 * | 5/2006 | Scott | A47G 23/0216 220/560 |
| 2008/0295383 A1 * | 12/2008 | Wakefield | A01K 97/10 43/21.2 |

(Continued)

*Primary Examiner* — Joshua D Huson
(74) *Attorney, Agent, or Firm* — Peacock Law P.C.; Justin Jackson

(57) ABSTRACT

A fishing cooler for a beverage container. The fishing cooler preferably has a container insulator with a spool disposed thereon. Optionally, a lure holder can be incorporated into or otherwise attached to the container insulator. A cleat can also optionally be provided on the container insulator. Most preferably, fishing line is wrapped around the spool such that a user can hand-fish while grasping the fishing cooler.

17 Claims, 4 Drawing Sheets

(56) References Cited

U.S. PATENT DOCUMENTS

| | | | |
|---|---|---|---|
| 2010/0294816 A1* | 11/2010 | Sentell | A45F 5/02 224/148.3 |
| 2012/0187138 A1* | 7/2012 | Vasquez | A45C 1/02 220/739 |
| 2013/0014424 A1* | 1/2013 | Weishner | A01K 79/02 43/17.5 |
| 2013/0031823 A1* | 2/2013 | Arias | A01K 97/06 43/54.1 |
| 2013/0153591 A1* | 6/2013 | Grimes | A01K 91/02 220/735 |
| 2013/0200089 A1 | 8/2013 | Vidal et al. | |
| 2013/0334237 A1* | 12/2013 | Priest | B65D 23/12 220/739 |
| 2014/0237887 A1 | 8/2014 | Grimes et al. | |
| 2016/0270575 A1* | 9/2016 | Panone | A47G 21/145 |

* cited by examiner

INSULATED HOLDER FOR BEVERAGE CONTAINER WITH FISHING SPOOL

CROSS-REFERENCE TO RELATED APPLICATIONS

Not Applicable.

BACKGROUND OF THE INVENTION

Field of the Invention (Technical Field)

Embodiments of the present invention relate to an insulated holder for a beverage container having a fishing spool. More particularly, embodiments of the present invention relate to an insulated holder for a beverage container, of the type often generally referred to as a KOOZIE® brand insulated container for beverage cans (a federally registered mark of Scribe Opco, Inc.), which preferably has a fishing spool that projects from a side or a bottom thereof and onto which fishing line with a fishing lure can be wrapped to permit the user to hand fish while holding his or her beverage.

BRIEF SUMMARY OF THE INVENTION

An embodiment of the present invention relates to a fishing cooler having a container insulator comprising a first outside circumference, the container insulator further comprising an inside opening configured to at least partially encircle a beverage container; a spool disposed on a side of the container insulator, the spool having a second outside circumference; and the second outside circumference can be less than the first outside circumference. Optionally, the spool can be positioned on a vertical side or on a bottom side of the container insulator when the container insulator is positioned upright with its primary axis oriented vertically. Optionally, a cleat can be disposed on a side of the container insulator.

In one embodiment, a lure holder can also be provided. The lure holder can optionally be positioned on a vertical side of container insulator when the container insulator is positioned upright with its primary axis oriented vertically. The lure holder can be formed at least partly from a flexible material which itself can be disposed on an outside of the container insulator. The container insulator can include an opening in its bottom when the container insulator is positioned upright with its primary axis oriented vertically.

An embodiment of the present invention also relates to a fishing cooler having a container insulator that includes an inside opening configured to at least partially encircle a beverage container; a spool disposed on a side of the container insulator; and a lure holder.

In one embodiment, the spool can be disposed on a bottom side of the container insulator when the container insulator is positioned upright with its primary axis oriented vertically. Optionally, the can have a diameter that is at least as large as an outside diameter of the container insulator.

Optionally, the container insulator can be formed from a closed-cell foam, which can optionally include a rubber or plastic coating applied thereto. In one embodiment, the container insulator can be formed from a flexible material. Fishing line can optionally be tied to the spool.

An embodiment of the present invention also relates to a fishing cooler having a container insulator that includes an inside opening configured to at least partially encircle a beverage container; a spool disposed on a vertical side of the container insulator when the container insulator is positioned upright with its primary axis oriented vertically; a cleat disposed on the vertical side of the container insulator; and a lure holder disposed on the vertical side of the container insulator.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
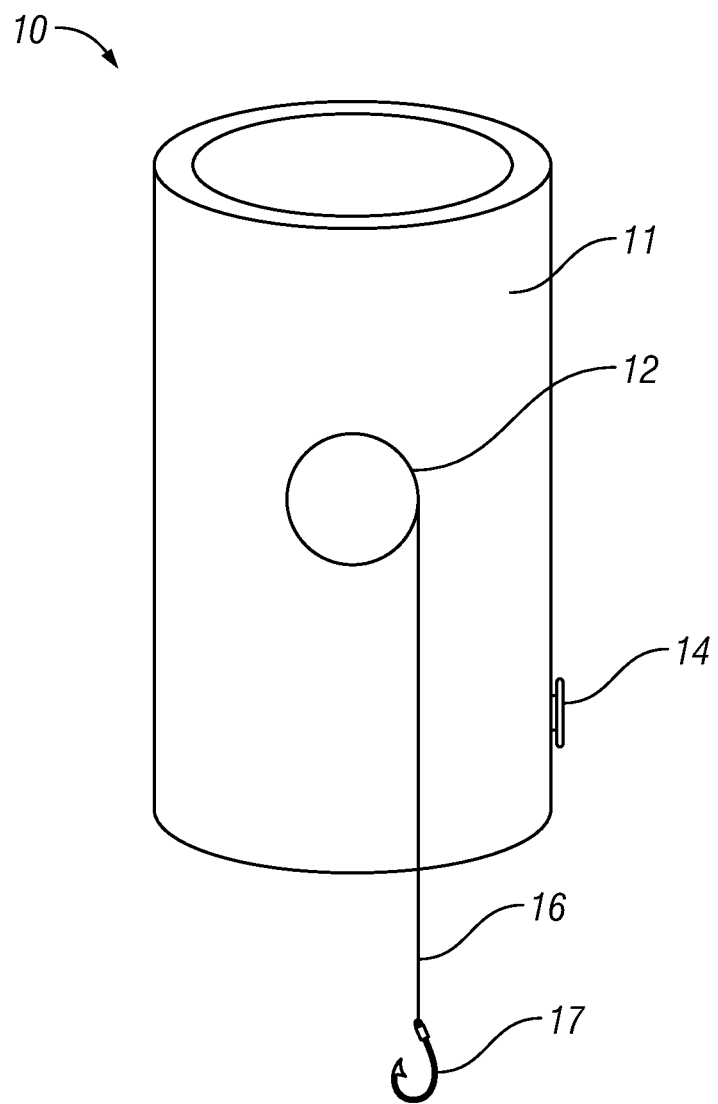
FIG. 1 illustrates a front view of a fishing cooler with a spool on a side.

Referring now to the drawings, an embodiment of the present invention relates to fishing cooler 10 which preferably has container insulator 11 and spool 12. Spool 12 most preferably comprises a spool-shape (including a narrow diameter and a larger diameter on at least a distal end thereof) and can optionally be positioned onto a side or bottom of fishing cooler 10. In one embodiment, spool 12 can optionally comprise a single continuous piece of material of container insulator 11 such that spool 12 is incorporated into and thus formed on container insulator 11. Alternatively, spool 12 can be a separate piece of material attached to fishing cooler 10 or otherwise disposed thereon. For embodiments wherein spool 12 is attached to container insulator 11, spool 12 can optionally be attached via an adhesive, or one or more fasteners including but not limited to sewing a portion of spool 12 onto container insulator 11. For example, in one embodiment, a rivet or button can be passed through a portion of container insulator 11 so as to secure spool 12 thereto. In one embodiment, spool 12 can comprise a backing plate that can be disposed inside of an inner diameter of container insulator 11 which can mate with and be locked onto a portion of spool 12—for example, spool 12 can comprise a barb that extends through container insulator 11 and which is received by and thus locks into an opening in the backing plate—likewise the backing plate can comprise a barb that passes through container insulator 11 and is thus received by and locked into an opening in spool 12.

In one embodiment, spool 12 can have a circular cross sectional shape and is most preferably tapered outward or otherwise flared such that the portion of spool 12 which is the most distal from container insulator 11 comprises a larger diameter than a central portion of spool 12. For example, spool 12 preferably comprises a conical or frustoconical shape which permits a user to wrap fishing line 16 around spool 12 and the larger diameter of the outside end of spool 12 helps to prevent the line from sliding off the end of spool 12. In one embodiment, spool 12 can have a maximum outside circumference that is greater than an outside circumference of container insulator 11. In an alternative embodiment, spool 12 can have a maximum outside circumference that is less than an outside circumference of container insulator 11. Most preferably, spool 12 comprises a maximum circumference that is about half the outside circumference of container insulator 11.

Spool 12 preferably can be used for retaining wrapped fishing line 16, and preferably keeps fishing line 16 secured onto fishing cooler 10. In one embodiment, spool 12 can preferably comprise a circular cross section, or can optionally comprise another cross sectional shape that is compatible with having fishing line 16 wrapped around it, including but not limited to, oval, hexagonal, octagonal, other geometric shapes, and the like. Spool 12 can extend outward from container insulator 11 and preferably maintains a substantially cylindrical shape.

In one embodiment, cleat 14 can optionally be provided and can be used to secure fishing line 16 onto fishing cooler 10. Optionally, cleat 14 can be used to secure a tail-end of fishing line 16 when storing lure 17. In one embodiment, a user can wrap fishing line 16 around cleat 14 so that the user can simply grasp fishing cooler 10 and move it about in order to move fishing line 16 and thus lure 17—this prevents the user from having to manipulate the line directly with his or her hand and thus prevents the user from experiencing discomfort from the fishing line digging or cutting into the user's hand—especially when a fish is pulling on fishing line 16.

Cleat 14 can optionally be a separate piece of material from container insulator 11, such that can be applied to container insulator 11. For example, cleat 14 can be secured to container insulator 11 via one or more fasteners, including but not limited to sewing cleat 14 onto container insulator 11. Optionally, cleat 14 can be formed in two parts such that a backing plate or another structure resides on an inside of container insulator 11, and a piece of cleat 14 preferably passes through a portion of container insulator 11 to engage and/or lock into the backing plate. In an alternative embodiment, cleat 14 can itself be integrated onto container insulator—for example, cleat 14 and container insulator 11 can comprise a single continuous piece of material such that cleat 14 is formed as a protrusion of container insulator 11.

Figure 2:
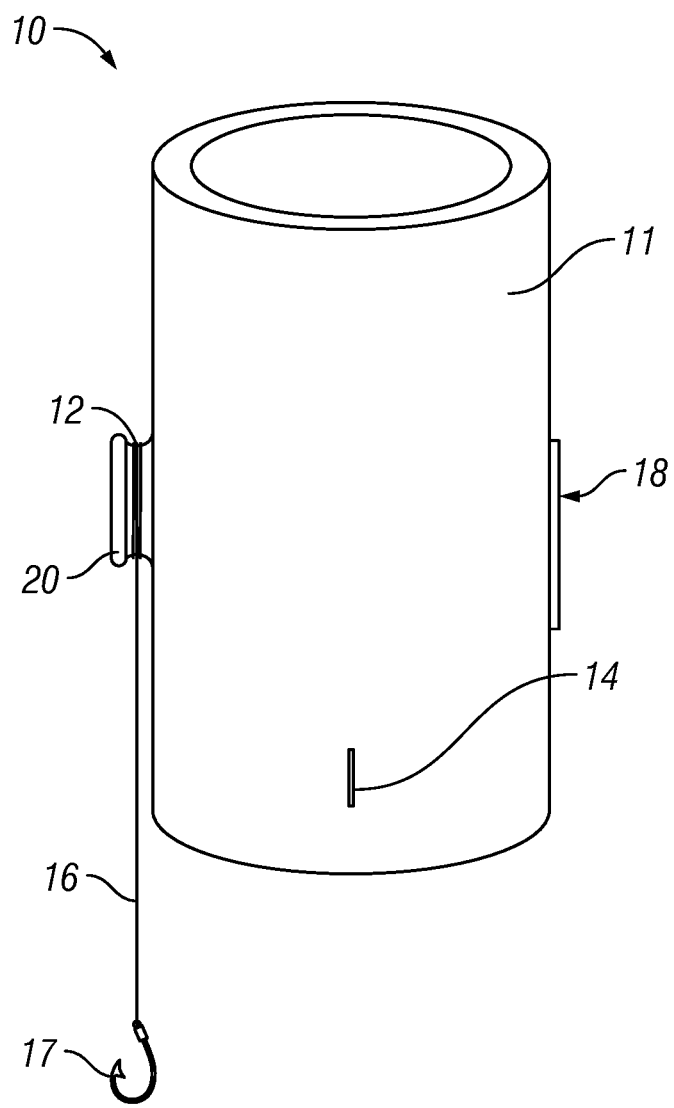
FIG. 2 illustrates a side view of the fishing cooler.

FIG. 2 illustrates a view of fishing cooler 10 where spool 12 comprises lip 20 on its outer edge. Lip 20 preferably helps to secure fishing line 16 on spool 12. Lip 20 preferably inhibits fishing line 16 from slipping off from spool 12. In one embodiment, spool 12 preferably comprises a spool shape such that a first lip 20 is disposed or otherwise formed on an outer end portion of spool 12 that is distal to container insulator 11. Optionally, a second lip 20 is disposed or can otherwise be formed on an end portion of spool 12 that is proximate to container insulator 11.

Figure 3:
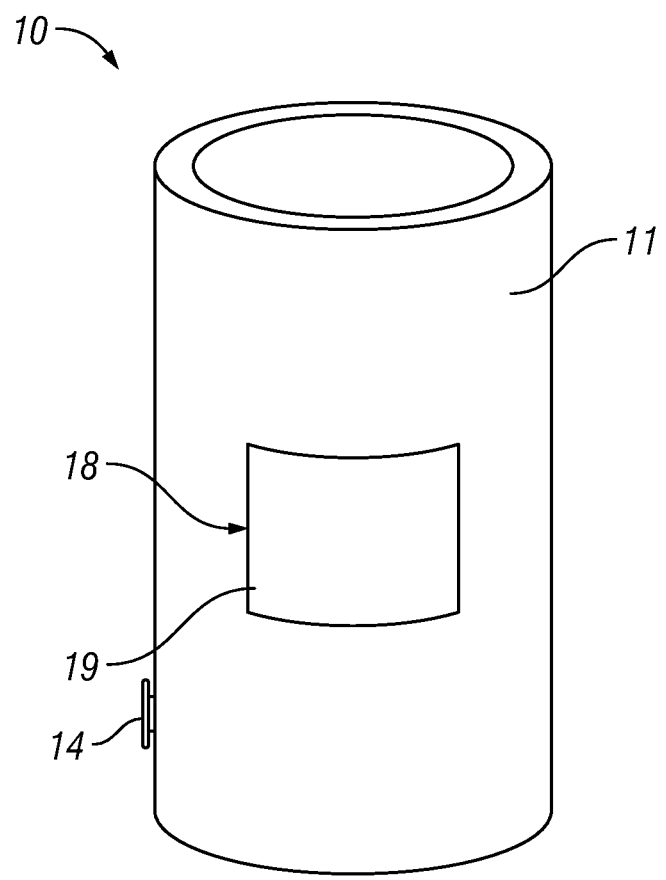
FIG. 3 illustrates a rear view of the fishing cooler.

In one embodiment, lure holder 18 can also be provided on fishing cooler 10. As best illustrated in FIG. 3, in one embodiment, lure holder 18 comprises a pocket-like shape—for example, in one embodiment, lure holder 18 can be formed by providing a piece of material 19, most preferably a flexible and/or elastic material. In this embodiment, one or more edges of material 19 can be secured to container insulator 11, leaving a section of an edge that is not secured to container insulator 11. For example, if material 19 is square, three sides of material 19 can be secured to container 11 and the fourth side can remain unsecured. In this configuration, a user can slide lure 17 into lure holder 18 through the unsecured side such that lure 17 is held in lure holder 18 between an outside surface of container insulator 11 and an inside surface of material 19. Optionally, material 19 can be attached to container insulator 11 by sewing it onto container insulator 11. In one embodiment, lure holder 18 can simply be a recessed area formed into a portion of container insulator 11. In one embodiment, lure holder 18 can comprise a slit that is cut or otherwise formed into container insulator 11. Of course, in one embodiment, lure holder 18 can be a completely separate structure that is attached to container insulator 11. For example, a small pouch, enclosure, or other attachment mechanism can be attached to container insulator 11—for example via one or more fasteners or via an adhesive or via any other attachment mechanism.

In one embodiment, lure holder 18 is preferably formed from a waterproof material suitable for holding a moist or wet lure, including but not limited to a closed-cell foam a plastic material, a rubber material, combinations thereof, and the like. In one embodiment, lure 17 can comprise a fishing implement including but not limited to a lure, a hook, or other fishing bait.

Figure 4:
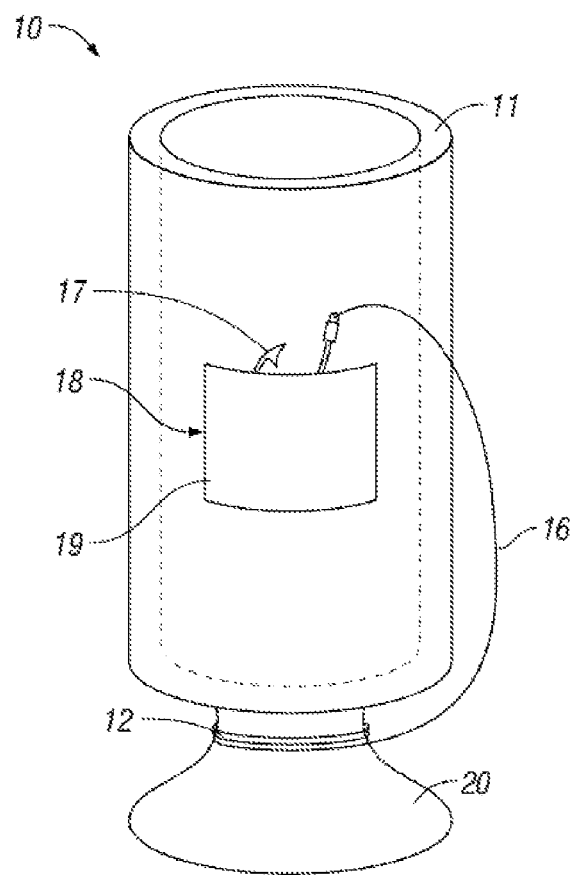
FIG. 4 illustrates a side view of the fishing cooler with a spool on the bottom.

Although in one embodiment, spool 12 is preferably provided on a vertical side of fishing cooler 10 (when fishing cooler 10 is positioned upright so as to hold a beverage container vertically), as best illustrated in FIG. 4, in one embodiment, spool 12 can be disposed on a bottom of fishing cooler 10. In this embodiment, spool 12 can be attached to or otherwise integrated into container insulator 11 as was previously described. For embodiments wherein spool 12 is disposed on a bottom of fishing cooler 10, spool 12 preferably comprises a bottom diameter that is as large as or about as large as container insulator 11. Alternatively, spool 12 can comprise a diameter that is larger than an outside diameter of container insulator 11, thus resulting in a larger and more stable base when fishing cooler 10 is placed onto a surface so as to prevent a beverage container held thereby from tipping over. In one embodiment, fishing cooler 10 can have spool 12 positioned anywhere on an exterior of container insulator 11.

Figure 5:
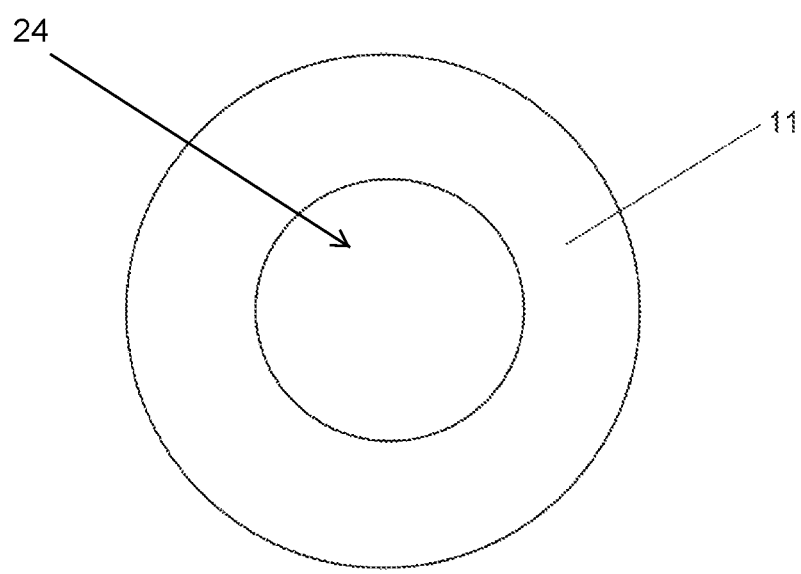
FIG. 5 is a drawing which illustrates a bottom of a container insulator having a hole disposed therein according to an embodiment of the present invention.

In one embodiment, container insulator 11 of fishing cooler 10 can comprise a bottom, which can be continuous or it can optionally have one or more openings 24 (see FIG. 5). Optionally, container insulator 11 can be provided without a bottom (for example, container insulator 11 can comprise a sleeve of material). Optionally, container insulator 11 can comprise a sleeve and can optionally comprise a strap of material that traverses the bottom opening of the sleeve so as to prevent a beverage container from falling out of the bottom of the sleeve when held by a user. In another embodiment, fishing cooler 10 can have one or more slits or openings on any part of its body. In another embodiment, fishing cooler 10 does not have bait cleat 14. In another embodiment, fishing cooler 10 does not have lure holder 18. In another embodiment, fishing cooler 10 can have an additional spool or protrusion in addition to spool 12. Likewise, fishing cooler 10 can have one or more additional pockets or containers attached to or incorporated into container insulator, in addition to lure holder 18. Including but not limited to additional lure holders that a user can use to store additional fishing lures or other fishing implements.

In one embodiment, container insulator 11 can be formed from a foam material, most preferably a closed-cell foam material and can optionally comprise a coating on an exterior and/or interior surface thereof. Such coatings can include but are not limited to a rubber and/or plastic coating. In one embodiment, container insulator 11, preferably comprises a substantially tubular shape, which can optionally have no bottom, a closed bottom, or a partially open bottom. In one embodiment, container insulator 11 can have an at least substantially circular inner opening. In one embodiment, container insulator 11, preferably comprises a substantially circular outer surface. Optionally, an outer surface of container insulator 11 can be coated in a first material while an inner surface of container insulator 11 can be formed from a second material. In one embodiment, container insulator 11 is formed from a flexible and/or resilient material. In an alternative embodiment, container insulator 11 is formed from a rigid material.

In one embodiment, lure holder 18 can comprise a void within spool 12. In one embodiment, the smallest outside diameter of spool 12 is preferably at least 50% smaller than the largest outside diameter of spool 12. In one embodiment, the length of the spool (for example the width dimension of the spool when it is positioned such that line is wrapped around it in a vertical fashion), is preferably less than about ½ of its maximum diameter, and more preferably less than about ⅓ of its maximum diameter. In one embodiment, at least 10 feet of fishing line and more preferably at least 20 feet of fishing line and most preferably at least 30 feet of fishing line can be wrapped around spool 12 and can optionally be provided on spool 12.

In one embodiment, the inside diameter of container insulator 11 preferably comprises a diameter that allows it to have a snug fit with a standard 12 ounce aluminum beverage container. In one embodiment, container insulator 11 preferably has an inside diameter of about 2.6 inches in diameter. In one embodiment, spool 12 is preferably not formed into container insulator 11 in such a manner that when fishing line 16 is wrapped around spool 12 and when a beverage container is disposed within the confines of container insulator 11, fishing line 16 will not encircle the beverage container. In one embodiment, when used as intended, liquid is not poured into container insulator 11, rather, a container which contains the liquid is preferably slid into an inner opening in container insulator 11.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and and/or reconfiguration of their relationships with one another.

What is claimed is:

1. A fishing cooler comprising:
  a fishing lure;
  a container insulator comprising a first outside circumference, said container insulator further comprising an inside opening configured to at least partially encircle a beverage container;
  a spool disposed on a side of said container insulator, said spool comprising a second outside circumference, said spool positioned such that a primary axis of said spool is at least substantially normal to a primary axis of said container insulator;
  said spool comprising a conical or frustoconical shape positioned such that an outside end portion of said spool comprises lamer diameter than a central portion of said spool;
  fishing line, said fishing line comprising a first end portion and a second end portion;
  said first end portion of said fishing line connected to said spool;
  said second end portion of said fishing line configured to connect to said fishing lure; and
  wherein said second outside circumference is less than said first outside circumference.

2. The fishing cooler of claim 1 wherein said spool is positioned on a vertical side of said container insulator when said container insulator is positioned upright with its primary axis oriented vertically.

3. The fishing cooler of claim 1 further comprising a cleat disposed on a side of said container insulator.

4. The fishing cooler of claim 1 further comprising a lure holder.

5. The fishing cooler of claim 4 wherein said lure holder is positioned on a vertical side of container insulator when said container insulator is positioned upright with its primary axis oriented vertically.

6. The fishing cooler of claim 4 wherein said lure holder comprises a flexible material disposed on an outside of said container insulator.

7. The fishing cooler of claim 1 wherein said container insulator comprises an opening in a bottom thereof when said container insulator is positioned upright with its primary axis oriented vertically.

8. A fishing cooler comprising:
  a fishing lure;
  a container insulator comprising an inside opening configured to at least partially encircle a beverage container;
  a spool disposed on a side of said container insulator, said spool positioned such that a primary axis of said spool is at least substantially normal to a primary axis of said container insulator;
  said spool comprising a conical or frustoconical shape positioned such that an outside end portion of said spool comprises larger diameter than a central portion of said spool;
  fishing line, said fishing line comprising a first end portion and a second end portion;
  said first end portion of said fishing line connected to said spool;
  said second end portion of said fishing line configured to connect to said fishing lure; and
  a lure holder.

9. The fishing cooler of claim 8 wherein said lure holder comprises a flexible material disposed on an outside of said container insulator.

10. The fishing cooler of claim 8 wherein said spool is disposed on a vertical side of said container insulator when said container insulator is positioned upright with its primary axis oriented vertically.

11. The fishing cooler of claim 8 further comprising a cleat disposed on a side of said container insulator.

12. The fishing cooler of claim 8 wherein said container insulator is formed from a closed-cell foam.

13. The fishing cooler of claim 12 wherein said closed-cell foam of said container insulator comprises a rubber or plastic coating applied thereto.

14. The fishing cooler of claim 8 wherein said container insulator is formed from a flexible material.

15. The fishing cooler of claim 8 further comprising fishing line tied to said spool.

16. The fishing cooler of claim 8 wherein said container insulator comprises an opening disposed in a bottom thereof when said container insulator is positioned upright with its primary axis oriented vertically.

17. A fishing cooler comprising:
- a fishing lure;
- a container insulator comprising an inside opening configured to at least partially encircle a beverage container;
- a spool disposed on a vertical side of said container insulator when said container insulator is positioned upright with its primary axis oriented vertically, said spool positioned such that a primary axis of said spool is at least substantially normal to a primary axis of said container insulator;
- said spool comprising a conical or frustoconical shape positioned such that an outside end portion of said spool comprises larger diameter than a central portion of said spool;
- fishing line, said fishing line comprising a first end portion and a second end portion;
- said first end portion of said fishing line connected to said spool;
- said second end portion of said fishing line configured to connect to said fishing lure,
- a cleat disposed on said vertical side of said container insulator; and
- a lure holder disposed on said vertical side of said container insulator.

\* \* \* \* \*

UNITED STATES PATENT AND TRADEMARK OFFICE
CERTIFICATE OF CORRECTION

| | |
|---|---|
| PATENT NO. | : 10,701,918 B1 |
| APPLICATION NO. | : 15/808297 |
| DATED | : July 7, 2020 |
| INVENTOR(S) | : Jacob Rutledge |

It is certified that error appears in the above-identified patent and that said Letters Patent is hereby corrected as shown below:

In the Claims

Column 5, Line 66 should read:
--1. A fishing cooler comprising:
a fishing lure;
a container insulator comprising a first outside circumference, said container insulator further comprising an inside opening configured to at least partially encircle a beverage container;
a spool disposed on a side of said container insulator, said spool comprising a second outside circumference,
said spool positioned such that a primary axis of said spool is at least substantially normal to a primary axis of said container insulator;
said spool comprising a conical or frustoconical shape positioned such that an outside end portion of said spool comprises larger diameter than a central portion of said spool;
fishing line, said fishing line comprising a first end portion and a second end portion;
said first end portion of said fishing line connected to said spool;
said second end portion of said fishing line configured to connect to said fishing lure; and
wherein said second outside circumference is less than said first outside circumference.--

Signed and Sealed this
Fifteenth Day of December, 2020

Andrei Iancu
*Director of the United States Patent and Trademark Office*